United States Patent

Mimken

[11] 3,900,797
[45] Aug. 19, 1975

[54] DIGITAL RANGE COMPUTER SYSTEMS FOR AIR NAVIGATION SYSTEMS SUCH AS TACAN

[75] Inventor: Frederick J. Mimken, Fairport, N.Y.

[73] Assignee: General Dynamics Corporation, St. Louis, Mo.

[22] Filed: Sept. 22, 1969

[21] Appl. No.: 859,679

Related U.S. Application Data

[62] Division of Ser. No. 467,897, June 29, 1965.

[52] U.S. Cl. .............................. 328/129; 328/44
[51] Int. Cl. ........................................ H03k 17/00
[58] Field of Search ........ 328/42, 44, 48, 129, 119; 307/222, 228, 217, 223

[56] References Cited
UNITED STATES PATENTS

| | | | |
|---|---|---|---|
| 2,519,184 | 8/1950 | Grosdoff | 328/48 |
| 3,063,016 | 11/1962 | Halton | 328/42 |
| 3,206,665 | 9/1965 | Burlingham | 307/217 X |
| 3,290,611 | 12/1966 | Horlacher et al. | 307/222 X |
| 3,423,576 | 1/1969 | Abe et al. | 328/44 |

*Primary Examiner*—Herman Karl Saalbach
*Assistant Examiner*—B. P. Davis
*Attorney, Agent, or Firm*—Martin Lukacher

[57] ABSTRACT

An electronic navigation system is disclosed having a range calculation unit including a velocity detector which provides an error signal having a sense and magnitude corresponding to the sense and magnitude of reply pulses which are received during transceiving operations. The calculation unit also includes a counter system for up-down counting of reply pulses which indicates the quantity of valid reply pulses which have been received.

5 Claims, 4 Drawing Figures

DIGITAL RANGE COMPUTER SYSTEMS FOR AIR NAVIGATION SYSTEMS SUCH AS TACAN

This application is a division of my application Ser. No. 467,897 filed June 29, 1965.

The present invention relates to computer systems, and particularly to systems for computing the range between stations which are in radio communication with each other.

The invention is especially suitable for use in electronic navigation systems which include an interrogator station for transmitting interrogation signals and a transponder station for receiving such signals and retransmitting reply signals in response thereto. The stations may be located in mobile craft or at fixed locations. In a typical system, the interrogation station is located in an aircraft and the transponder station is at a fixed ground location, such as a landing field. A navigation system of the foregoing type, in which the invention is especially adapted for use, is known as TACAN, which is an acronym for tactical air navigating system.

Computer systems for TACAN and like electronic navigation systems, which are known in the art, have used analog computer elements such as resolvers and potentiometers, which are mechanically controlled for the purpose of making calculations based on the information contained in interrogation and reply signals. Such mechanically operated analog computers have been limited in speed of response, accuracy and reliability by virtue of their mechanical components. The size and weight of the computers is also undesirably limited by their mechanical components, particularly for airborne applications.

It is desirable that the range computer search for and acquire the reply signals from a selected transponder station, within a short period of time, e.g., approximately 1.0 second in the case of high speed aircraft, in spite of the reception of squitter pulses and other extraneous signals and notwithstanding missing reply signals. After the reply signals are located and the selected transponder station is found, the station is desirably continuously tracked so that the range information may be continually updated by the computer. The absence of reply pulses from the transponder station may be encountered during tracking and presents significant problems in the case of a computer which does not include mechanical elements with sufficient inertia to accommodate missing replies, albeit at a loss in accuracy.

Another problem in transponder-interrogator electronic navigation systems is the effect of time variations or "jitter" of the reply pulse. Such jitter may result from propagation characteristics of the radio link or variations in delay between reception and transmission in the transponder station. Since range information is a function of the time interval between the time of transmission of an interrogation signal and the time of reception of a reply signal, such time jitter is detrimental to the accuracy of the range computation. It is therefore desirable, particularly in TACAN systems which are used in high speed aircraft, that the systems be accurate in spite of jitter of the same order of magnitude as the accuracy of the range measurement.

Accordingly, it is an object of the present invention to provide improved computer systems especially adapted for navigation purposes in which the foregoing problems and disadvantages are substantially eliminated.

It is a still further object of the present invention to provide a range computer system for TACAN and like electronic navigation systems which makes extensive use of digital circuit elements and is of lighter weight, smaller size and greater reliability than electronic navigation systems heretofore available.

It is a still further object of the present invention to provide a digital range computer for TACAN and like navigation systems which is effective in providing accurate measurements under conditions where extraneous pulses are present and under otherwise poor signal to noise conditions.

It is a still further object of the present invention to provide a digital range computer for TACAN and like navigation systems which is effective in providing accurate range measurements in spite of time instability or jitter of reply pulses.

It is a still further object of the present invention to provide a range computer for TACAN and like navigation systems which is capable of tracking a desired transponder station in the absence of a large number of successive reply signals and even while identity tones are being transmitted by that transponder station.

Briefly described, a computer system embodying the invention includes a calculation unit for producing a number corresponding to the elapsed time between an interrogation signal and a reply signal, which are applied to the computer system. The reply signal may be in the form of a pulse. The computer system also includes a plurality of control units which are responsive to the interrogation and reply signals and to calculations registered in the calculation unit between successive cycles of interrogation and reply signals. An interrogation-reply signal cycle is referred to hereinafter as a "dwell". One of the control units provides a synthetic reply pulse which is called a filler pulse, on the basis of the calculations made by the calculation unit on successive dwells. Another control unit, which is also responsive to such calculations, generates a range gate which opens during a selected period of time during each dwell in which reply signals are expected to arrive. An input control unit, which is operated by the filler pulses and by reply pulses which are passed during the period established by the range gate control unit maintains the calculation unit operation in a continual fashion, notwithstanding the absence of reply signals. A search or acquisition control unit is responsive to the filler pulses and the reply signals which are passed during the range gate intervals for controlling both the range gate control unit and the calculation unit in a manner to provide different modes of operation thereof (viz. a search phase and a tracking mode of operation). The acquisition control unit reads out the calculating unit upon receipt of successive reply pulses during the tracking mode of operation and prevents read-out during the search mode. The range calculation is therefore updated at the end of each dwell.

The input control unit may include means responsive to the time of occurrence of the filler pulse and an actual reply pulse for supplying velocity information to the calculation unit on the basis of which accurate range calculation can be made in spite of reply jitter. A velocity detector may be included in the input control unit which provides an error signal having a sense and magnitude corresponding to the sense and magnitude of difference between the expected time of occurrence of a reply pulse (i.e. the time of occurrence of the filler pulse) and the actual time of occurrence of a reply pulse. This error signal is averaged over a number of dwells and used to correct the information which is supplied to the calculation unit of the range computer. The use of velocity averaged error signals has also been found to facilitate range computer operation, even in the absence of a succession of reply pulses, such as may occur while the range computer system is tracking during the transmission of an identity tone by the replying transponder station.

The invention itself, both as to its organization and method of operation, as well as additional objects and advantages thereof will become more readily apparent from a reading of the following description in connection with the accompanying drawings in which.

Figure 1:
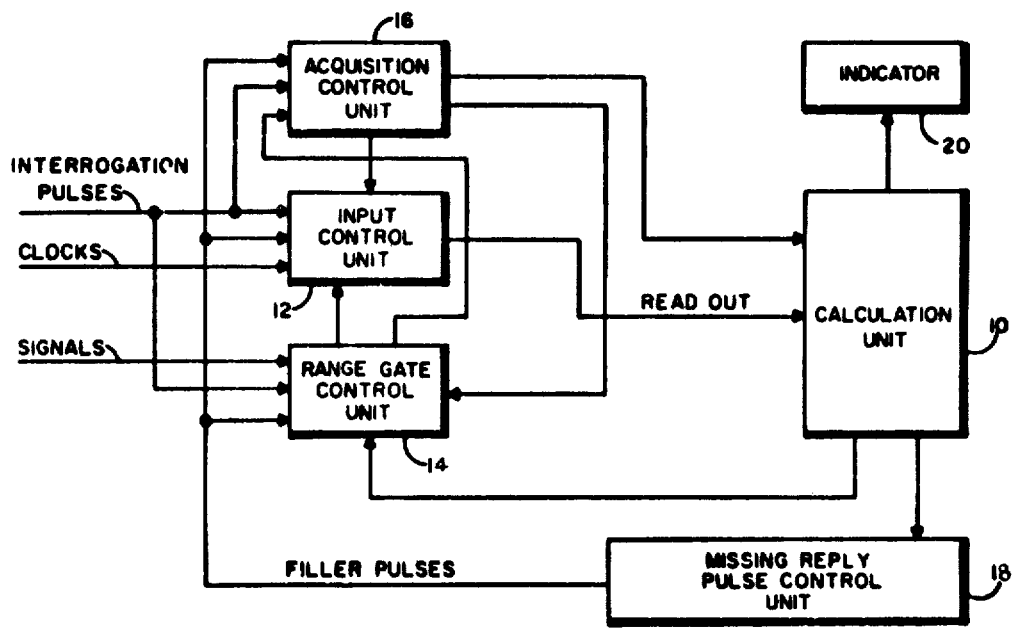
FIG. 1 is a simplified block diagram of a range computer system in accordance with the present invention.

Referring more particularly to the drawings, there is shown in FIG. 1 a range computer system which is adapted to be used in an airborne TACAN set. As the description proceeds, it will be apparent that the computer system may substantially entirely be constructed from digital circuit elements, such as gates and flipflops. These circuits are available as microelectronic circuit components, which are highly reliable and very small in size. Accordingly, a range computer embodying the invention may be very small in size as compared to range computers of the type previously used in TACAN and like electronic navigation systems.

It will further become apparent as the description proceeds, that mechanical variable elements, such as motor drives, potentiometers and relays and resolvers are eliminated, thereby further enhancing the reliability and reducing the size of the range computer system range computers that have heretofore been available. Reference may be had to the text *Electronic Aviation Engineering* by Peter C. Sandretto, especially Chapters 10 and 12 thereof, for further information with respect to range computers of the type known in the art. This text also describes the modulating and tuner circuits, which respectively provide the interrogation pulse and receive the reply and other signals which are used as inputs to the range computer.

The range computer system, as shown in FIG. 1, includes several subsystems; namely, a calculation unit 10, an input control unit 12, a range gate control unit 14, an acquisition control unit 16 and a missing reply pulse control unit 18. The calculation unit is read out into an indicator 20. Interrogation pulses from the TACAN transmitter operate the input control unit 12 and provide for the transmission of the clock pulses to the calculation unit 10. The clock pulses desirably have a frequency related to the round trip travel time of the interrogation pulses from the interrogator station to the transponder station and back from the transponder station to the interrogator station. A clock frequency of 8.092 megacycles, which has a pulse spacing corresponding to 0.01 miles of range, has been found suitable. The calculation unit 10 includes digital circuits for counting the clock pulses until such time as a signal, which is desirably a reply pulse from the transponder station, is passed by the range gate control unit 14 to the input control unit 12, so as to stop the transmission of clock pulses to the calculation unit 10. On the initial dwell, the range gate control unit is responsive to the interrogation pulses, so that the input control unit will stop the transmission of clock pulses upon occurrence of the first signal received after the initial interrogation pulse is transmitted.

On subsequent dwells, the calculation unit controls the range gate control unit 14, so as to permit the passage of signals during a finite period of time during a dwell, based upon the time of occurrence of a signal on the preceding dwell. The time period is called the "range gate."

The missing reply pulse control unit 16 receives an output from the calculation unit 10 when a reply pulse is indicated as being missing based upon information stored in the calculation unit during a preceding dwell. The missing reply pulse control unit 18 generates a synthetic reply pulse, which is referred to hereinafter as a filler pulse, to take the place of a missing reply pulse. The filler pulse operates the input control unit 12 and the range gate control unit 14 as though it were an actual reply pulse. Accordingly, the calculation unit 10 continues to operate to provide the same range readout over a number of missing reply pulses. The calculation unit 10 also responds to the loss of reply pulses for a certain number of dwells and thereafter indicates that the transponder unit, which had previously been supplying the reply signals, has been lost.

The filler pulses also operate the acquisition control unit 16. Either reply signals, which are indicated by the range gate control unit 14 as being valid replies, or filler pulses which are received from the missing pulse control unit 18, are present during each dwell; the start of which is recognized by the acquisition control unit from the interrogation pulses, which are applied thereto. The acquisition control unit calculates a number, say 6, corresponding to six reply signals, as being indicative of the acquisition of a selected transponder. This number is incremented by the range replies to the unit 16 and decremented by the filler pulses. When the desired number is indicated, the range computer is switched by the acquisition unit 16 from a search mode to a tracking mode of operation. In the event that the computer is operating in the tracking mode and a number of missing reply pulses are received which is sufficient to decrement the number calculated by the acquisition control unit 16 to a certain extent, the loss of the reply signal is recognized and the unit 16 reconditions the computer to the search mode of operation.

The acquisition control unit 16 operates the range gate control unit 14 to prevent the filler pulses from operating the range gate control unit 14 during the search mode of operation so as to prematurely end the range gate. Also, the acquisition control unit 16 conditions the calculation unit 10 to read out the range calculation unit once per dwell during the tracking mode of operation. An indicator 20, which may be digital-to-analog converter, converts a digital output provided by the calculation unit into an analog signal for driving a meter of the type used in TACAN system. Alternatively, a digital readout device, such as used in digital voltmeters, may be used as the indicator 2 to display the range calculation.

The operation of the range computer system may be more clearly understood by referring to the waveforms and accompanying description of my above referenced patent.

Figure 2:
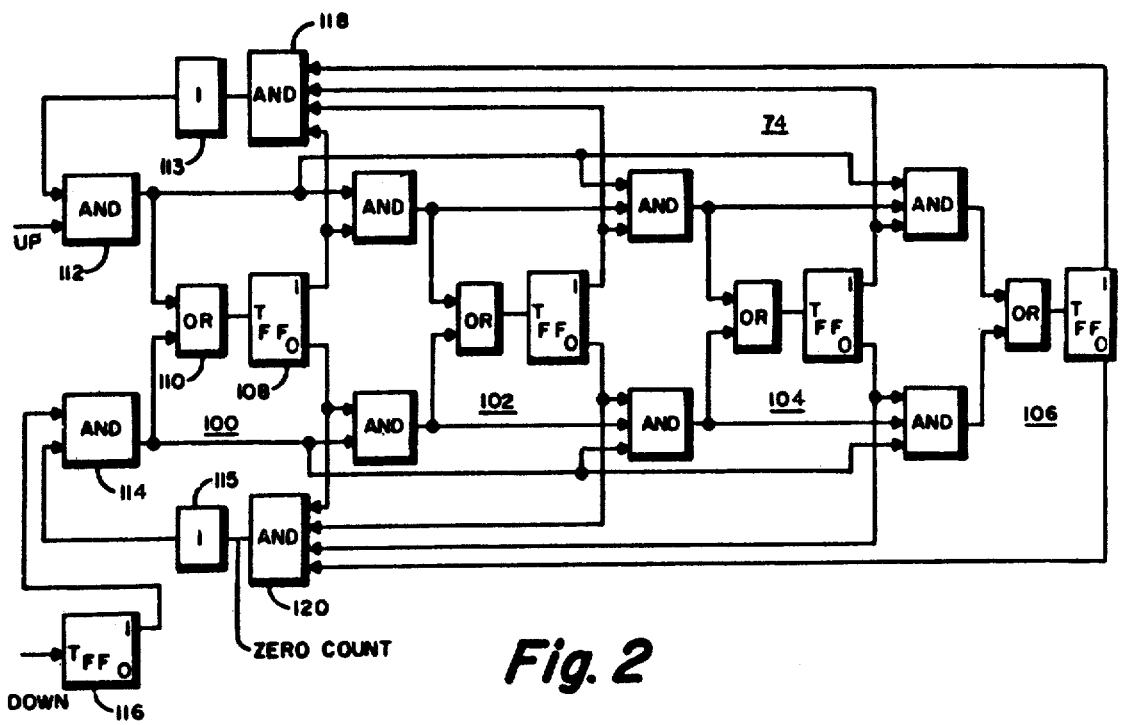
FIG. 2 is a block diagram of the acquisition counter used in the acquisition control unit shown in FIG. 1.

The counter 74 in the acquisition control unit 16 is shown in FIG. 2 as a four-stage counter. It will be appreciated, however, that additional stages may be included. For example, it may be desirable to provide one or more additional counter stages so that the counter may count up to or down from a larger number than is the case for the illustrated counter. For example, it may be desirable to add an additional stage to the counter so that the counter may reach a count of fifteen. In order to decrement the counter to zero count, at least fifteen filler pulses would be required. Accordingly, a large number of missing pulses would be needed in order to switch the range computer from its tracking mode to its search mode of operation.

The illustrated counter has four stages 100, 102, 104 and 106, which are connected in a tandem. Each stage includes a flip-flop 108, having a trigger or toggle input which causes the flip-flop to change states upon receipt of a pulse. An OR gate 110 is output connected to the trigger input of the flip-flop 108. Inputs to the OR gate 110 are supplied by a pair of AND gates 112 and 114. The AND gates 112 and 114 of the first stage 100 receive, as inputs, the range-gated reply signals and the filler pulses. The range-gated reply signals are connected to the up terminal of the counter in order to cause the count to be incremented, while the filler pulses cause the count to be decremented and are applied to the down terminal of the counter. The down terminal may be connected to a trigger input of a flip-flop 116, the "1" output of which is input connected to the AND gate 114. This flip-flop 116 will provide one output pulse for each pair of input pulses. Accordingly, two filler pulses will be required to register a single count in the downward direction, whereas only a single reply pulse will be required to increment the count. It is desirable to use the flip-flop 116 to divide the number of filler pulses which are applied to the down counter in half in applications where the reply pulse efficiency is low and a large number of missing pulses may be expected. The counter 74 may be considered topologically as having an "up-side" and a "down-side." The up-side is associated with the 1 outputs of the flip-flops on the AND gate 112. The down-side is associated with the "0" outputs of the flip-flops and the gate 114.

The up-side of the counter 74 includes an AND gate 118 which receives inputs from the 1 outputs of the flip-flops in each of the stages 100, 102, 104 and 106 and is connected to the input of the AND gate 112 by way of an inverter 113. The AND gate 114 on the down input terminal side of the counter receives an output from an AND gate 120 on the down side of the counter by way of an inverter 115. This gate 120 is input connected to the 0 outputs of the flip-flops of each of the stages 100, 102, 104 and 106. The AND gates in the stages 102, 104 and 106, which are on the up-side of the counter, are connected in tandem, each AND gate being output connected to an input of the AND gate in a succeeding stage. In addition, the AND gates in the latter stages 104 and 106 are all input connected to the output of the similarly connected AND gate 112 in the first stage. Similar connections are provided between the inputs and outputs of the AND gates on the down side of the counter 74.

By virtue of the interconnection of the up-side and down-side AND gates, a reply pulse which is applied to the up terminal at the input of the gate 112 will cause the first stage flip-flop 108 to change state and will also cause changes in state in those other flip-flops which must change stage in order to increment the count. If all of the flip-flops are in their 1 state, which is indicative of the highest count which may be stored in the counter (viz. 8, in the illustrated counter), the AND gate 112 in the first stage 100 will be inhibited. The counter therefore will not reach a count higher than 8, nor will additional up pulses cause the counter to recycle, since the down side AND gates are similarly connected to the up-side AND gates. A down pulse which is applied to the first stage AND gate 114 will change the state of the first stage flip-flop 108 and be propagated by the AND gates of the successive stages in order to change the states of the respective flip-flops so as to decrement the count stored in the counter. The AND gate 120 is operative to inhibit the AND gate 114 when a zero count is stored in the counter. Pulses which are applied to the down terminal after the counter is decremented to zero do not further affect the count. The output of the AND gate 120 may be used to supply the zero count output of the counter. This zero count output is used to extend the range gate, as explained above in connection with FIG. 2 of my above referenced patent.

The operation of the acquisition counter 74 may be more clearly understood by consideration of a specific case wherein a predetermined count, say 4, is stored in the counter. In such a case, all of the flip-flops except the flip-flop in the third stage 104 are in their zero states. A reply pulse, which is applied to the up terminal will propagate through the AND gate 112 of the first stage and cause the flip-flop 108 in that stage to change state. The flip-flop in the second stage 102 does not change state because the flip-flop in the first stage 100 inhibits the second stage AND gate while the reply pulse is being propagated. Similarly the AND gate in the third stage 104 blocks the propagation of the reply pulse to that stage. The reply pulse also does not propagate to the fourth stage 106 because the AND gate of that stage is inhibited by the output of the AND gate in the third stage 104. Only the first stage AND gate will change states, thereby the count registered in the counter is incremented to 5.

Again, assuming that the counter has a count of 4 stored therein, when a filler pulse causes the flip-flop 116 to change from its zero to its 1 state, a pulse is propagated through the AND gate 114 which causes the first stage flip-flop 108 to change states. The second and third stage AND gates are enabled by the zero outputs of the flip-flops in the first and second stages 100 and 102 respectively. Accordingly, the down pulse causes the second and third stage flip-flops to change their state. Since the third stage flip-flop was in its 0 state, the fourth stage AND gate is inhibited. Accordingly, the fourth stage flip-flop does not change state. The first stage flip-flop is left in its 1 state, the second stage flip-flop is left in its 1 state, and the third stage flip-flop is returned to its 0 state. The fourth stage flip-flop remains in its 0 state. Accordingly, a count of 3 is registered in the counter. The counter 74 has the advantage of a rapid counting cycle since the pulses are propagated simultaneously to all the stages. Another advantage of the counter is that a minimum number of logic elements are required, namely a pair of AND gates, an OR gate and a single flip-flop per counter stage.

Figure 3:
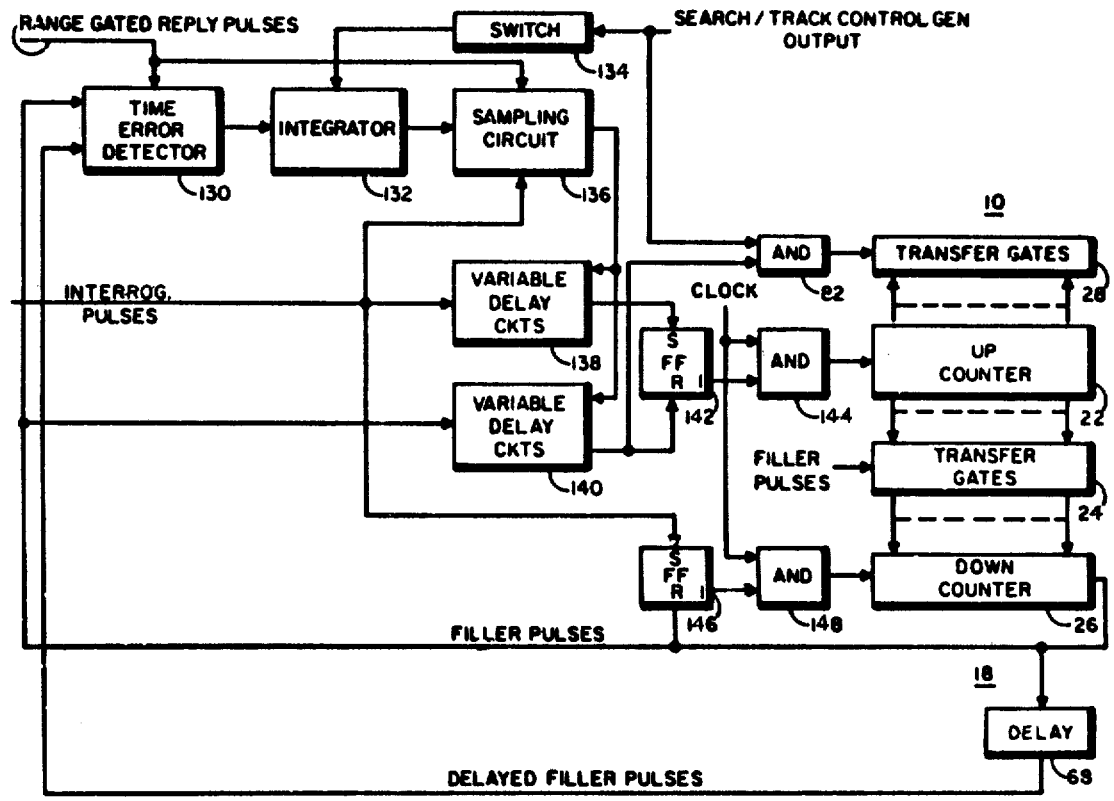
FIG. 3 is a simplified block diagram of a range computer system embodying the invention showing the components thereof which provide velocity averaged error signals.

The range computer shown in FIG. 3 is similar to that shown in my above referenced patent, except insofar as the input control unit is concerned. Accordingly, only portions of the calculation unit 10 and the missing pulse control unit 18 are shown in FIG. 3 in order to clarify the illustration and the ensuing description. The input control unit shown in FIG. 3 may also utilize elements of the input control unit 12. For example, the counter control flip-flop 38 and the AND gate 40 may be utilized. It may be desirable to provide suitable circuit components and switching for operating the range computer with its elements inter-connected, as shown in FIG. 2 during the search mode of operation and use its circuit elements connected with its additional components during the tracking mode of operation.

As will become more apparent as the description of the range computer shown in FIG. 3 proceeds, advantages thereof, such as accommodation of reply pulse jitter and effective operation in spite of a large number of missing reply pulses as may occur while tracking during identity tone transmission may be more fully appreciated. The input signals to the system shown in FIG. 3 are the range gated reply pulses which may be obtained at the output of the AND gate 58 (FIG. 2 of my above referenced patent) and the lagging edge of the interrogation pulses as may be obtained from the pulse shaping circuit 36. A circuit such as the pulse shaping circuit may be used to provide the lagging edges of the range gated reply pulses as input pulses to the system of FIG. 3. Accordingly, where range gate reply pulses or interrogation pulses are mentioned hereinafter in connection with a description of FIG. 3, it will be understood that pulses occurring at the lagging edges of such reply pulses and interrogation pulses are being utilized. Also utilized in the system of FIG. 3 are the filler pulses and the delayed filler pulses which are available at the zero pulse output of the down counter 26 and at the output of the delay circuit 68 respectively; the latter being included in the missing pulse control unit 18. The lagging edges of the filler pulses may also be used in the same manner as the lagging edges of the reply and interrogation pulses in order to provide a timing in the system of FIG. 3. The search/track generator flip-flop 80 output level is also used.

The filler pulses and the reply pulses are applied to a time error detector 130. The time error detector derives an output voltage which has a polarity and a magnitude which depends upon the sense and magnitude of the difference bvetween the time of occurrence of the filler pulses and the reply pulses during each dwell. Inasmuch as this time difference may be very minute, (viz. a matter of nanoseconds) the time error detector includes circuitry for providing either a train of pulses of one polarity or a train of pulses of opposite polarity during each dwell. The average voltage magnitude of this train of pulses corresponds to the time difference. This average value is obtained by means of an integrator circuit 132 which may be a resistance-capacitance integrator having a time constant sufficient to follow relatively slow variations in the voltage produced by the error detector 130 during the tracking mode of operation of the computer and therefore averages the error voltage over a large number of dwells, 50 being suitable during the tracking mode. In the event that the computer includes the input control unit shown in FIG. 3 for both search and tracking modes of operation, it is desirable to include a system 134 for reducing the time constant of the integrator 132 by several orders of magnitude, so that the error voltage may vary rapidly from dwell to dwell, in order to achieve rapid acquisition. This may be accomplished by switching a resistor of proper value across a time constant determining resistor in the integrator 132. Such switching may be accomplished by transistors or like active devices which are actuated by the search/track control generator flip-flop 80 output. The time error detector 130 will be described more fully hereinafter in connection with FIG. 7. The delayed filler pulses are applied to the time error detector so as to reset the detector at the end of each dwell.

An error voltage is obtained from the integrator 132 by means of a sampling circuit 136 which is operated upon occurrence of the interrogation pulses and the range gate pulses. This sampling circuit produces pulses somewhat wider than the interrogation and reply pulses, and coincident therewith. Of course, the output pulses from the sampling circuit have an amplitude and polarity depending upon the error voltage at the integrator 132 at the time of sampling.

The output pulses from the sampling circuit are applied to variable delay circuits 138 and 140. The interrogation pulses are applied to one of these variable delay circuits 138 while the filler pulses are applied to the other of the variable delay circuits 140. These delay circuits may be designed in accordance with techniques known in the art. A suitable delay circuit may include a ramp generator which initiates a ramp generator which initiates a ramp voltage when a pulse is applied thereto. The interrogation pulses may initiate the ramp in the case of the delay circuits 138, while the filler pulses may initiate the ramp in the cases of the delay circuits 140. The sampled error voltage and the ramp may be compared with each other, say in a difference amplifier. When the output voltage of the difference amplifier reaches a predetermined level, the amplifier triggers a circuit which provides a pulse. The time of occurrence of the pulse with respect to the initiation of the ramp depends upon the amplitude of the error voltage provided by the output of the sampling circuit. In the absence of an error voltage, the variable delay system presents substantially no delay and produces an output pulse substantially coincident with the interrogation pulse in the case of the delay circuits 138 and with the filler pulse in the case of the circuits 140. The error voltage will delay the interrogation pulse or the filler pulse, depending upon the polarity of the sampled error voltage and for an interval, depending upon the magnitude of the sampled error voltage. The sampled error voltage, for example, may be positive in polarity when the range gated reply pulse is early (viz. the range gated reply pulse occurs ahead of the filler pulse). The sampled error voltage may be negative in the event that the reply pulse is late. A positive sampled error voltage will produce an output pulse from the variable delay circuits 138, which is delayed in respect to the interrogation pulses. A negative output voltage indicative of a late reply pulse will operate the circuits 140 to delay the filler pulse. On the other hand, a negative sampled error voltage will not cause any delay of the interrogation pulses due to the delay circuits 138. Similarly, a positive error voltage will not produce any delay in the filler pulses due to the action of the circuits 140.

The output pulses from the variable delay circuits 138 and 140 are respectively applied to set and reset terminals of a flip-flop 142 which functions as the up counter 22 control generator. When the flip-flop 142 is set, it enables AND gate 144, which is similar to the AND gate 40 (FIG. 2 of my above referenced patent) and permits that gate to transmit clock pulses which are counted in the up counter. Since, as explained above, a time error due to an early reply pulse delays the interrogation pulse, the counter control generator flip-flop 142 will delay the start of calculations by the up counter 22. The up counter 22 will be stopped by the filler pulse which is not delayed when the error detector 130, the integrator 132, and sampling circuit 136 produce an output voltage indicative of an early reply pulse. Accordingly, the count reached by the up counter is reduced to correspond to the early arrival of the reply pulse. Conversely, the late arrival of a reply pulse will not delay the start of the up counter but will delay the time when the up counter is stopped. The count is therefore increased to represent the late arrival of a reply pulse. The foregoing condition corresponds to the condition where an aircraft is moving away from a transponder so that reply signals which are being tracked arrive at later and later intervals.

The time interval between the interrogation pulse and the filler pulse represents the range measurement at one dwell, while the time interval between the range gated reply pulse and the interrogation pulse represents the range of the succeeding dwell. The difference between these time intervals is a measure of the change of range or the velocity of the interrogator equipped aircraft. The time error detector provides an output which is proportional to this velocity. The velocity is averaged over a number of dwells by the integrator 132. This average velocity error is used in the variable delay circuits 138 and 140 to supply information to the calculation unit so as to correct the count. In the event that there is no change in velocity, the count calculated in the calculation unit depends upon the time between the time of occurrence of the interrogation pulse and the range gated reply or filler pulse during each dwell. In this connection, it will be noted that the range gated reply or filler pulses enable the transfer gates and transfer the count from the up counter to the down counter at the end of each dwell. The time corrected filler pulses also are applied to the transfer gates 28 to read out the computation. The velocity averaging feature permits the computer to track reply signals even in the absence of a large number of reply signals, say during an identity tone, because the integrator 132 provides an output voltage which persists over the large number of dwells during which such reply pulses may be missing. Readout during such dwells is accomplished by the filler pulses which are obtained from the delay circuits 140.

The down counter is enabled by a flip-flop down counter control generator 146 which enables an AND gate 148 which supplies the clock pulses to the down counter. The flip-flop 146 is set and reset respectively by the interrogation and filler pulses. Accordingly, the down counter produces a zero pulse which is translated into a filler pulse on each dwell, notwithstanding that a range gated reply is produced.

The count registered in the up counter 22 during a dwell represents the calculated range which is corrected in accordance with the average value of the change in range (i.e. velocity) over a number of dwells. In other words, the velocity of the integrator equipped craft is tracked as well as the reply signals which are translated into range measurements by the computer. The count in the up counter is transferred to the down counter 26, upon occurrence of a filler pulse, by the transfer gates 24. The filler pulse is produced on the next dwell at a time corresponding to the count registered in the down counter in the preceding dwell. Since this count is velocity averaged, the filler pulse is generated at a time in the dwell at which the reply pulse would occur on the average. The time of occurrence of the filler pulse is corrected on each dwell in accordance with the average time error between it and the reply pulse. The actual time of occurrence of the filler pulse varies as the range of the interrogator equipped craft closes or opens with respect to the transponder.

Figure 4:
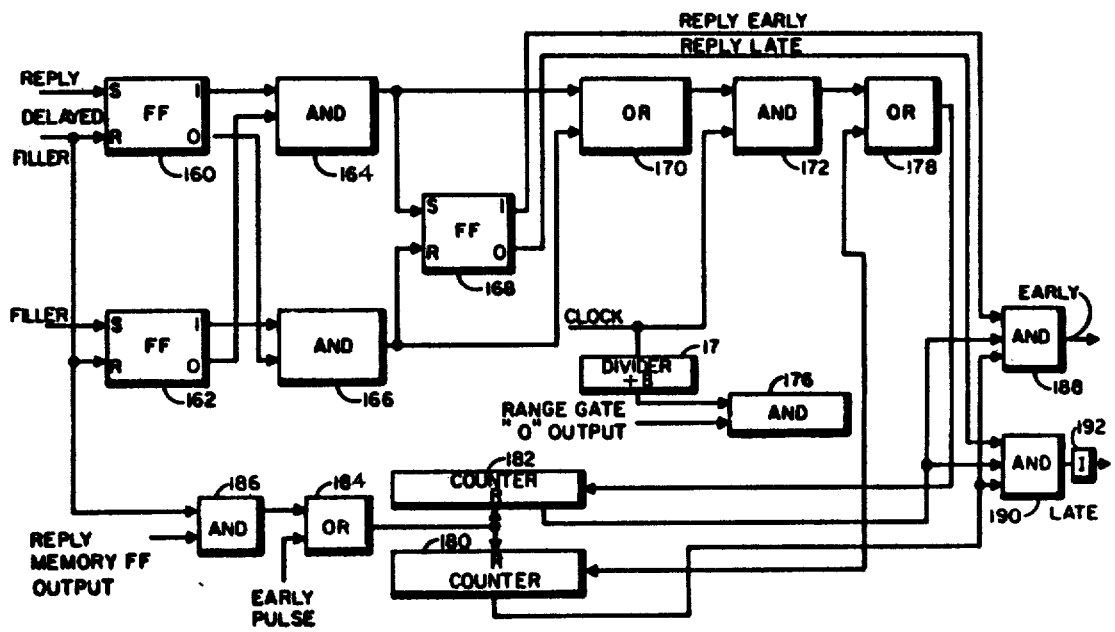
FIG. 4 is a block diagram of the error detector system shown in FIG. 3.

The time error detector 130 is shown in FIG. 4. Inputs to the time error detector are the reply and filler pulses. The delayed filler pulse is also applied as an input when generated. The time between the reply and the filler pulse is generally very, very short. For example, when the velocity of the craft is not substantial, the reply and filler pulses are substantially coincident. During tracking, the time between the reply and filler pulses is under 1 microsecond. This time period is several orders of magnitude lower than the period of a dwell. The error detector system shown in FIG. 4 has the feature of obtaining an error voltage responsive to the time error between the reply and filler pulses, which error voltage is produced during the entire dwell, notwithstanding that the time period when the time error is produced is many orders of magnitude smaller than the dwell period.

The time difference is digitized by logic elements which derive the sense of the difference. These logic elements include a first flip-flop 160 which is set by the reply pulse and reset by the delayed filler pulse. A second flip-flop 162 is set by the filler pulse and also reset by the delayed filler pulse. When the reply pulse is early (viz. occurs before the filler pulse), an AND gate 164 is enabled by the first flip-flop 160. The second flip-flop 162 enables the AND gate 164 until the filler pulse arrives. The time between the time of occurrence of the reply pulse and the time of occurrence of the filler pulse is represented by the width of the output pulse from the AND gate 164.

A second AND gate 166 simultaneously provides an output pulse having a width corresponding to the time difference between the time of occurrence of the filler pulse and the time of occurrence of reply pulse when the reply pulse is late, (viz. occurs after the filler pulse). Either the AND gate 164 or the other AND gate 166 will provide a pulse during each dwell wherein a reply and filler pulse are produced. The delayed filler pulse resets the flip-flops 160 and 162 before the start of the next dwell.

A memory flip-flop 168, which is set by the output of the early reply AND gate 164 and is reset by the output pulse from the late reply AND gate 166 provides memory of the condition (either late reply or early reply) which was last sensed by the AND gates 164 and 166, thus an early reply or a late reply condition which was detected on a dwell will be remembered during the next succeeding dwell.

The magnitude of the time interval between the occurrence of the reply and filler pulses is derived by means of logic circuit, including an OR gate 170, which transmits the output pulses from the early reply AND gate 164 or of the late reply AND gate 166 to another AND gate 172. These pulses enable the AND gate 172 for the duration of the pulses produced by the gates, to pass the clock pulses which may be derived from the same source as the clock pulses shown in the preceding FIGS. These clock pulses may have, as previously set forth, a frequency of 8.092 megacycles per second.

The clock pulses are divided by a divider circuit 174, which may be a flip-flop divider which divides by eight to produce pulses having a frequency of approximately one megacycle per second. The latter pulses are transmitted through another AND gate 176 when that AND gate is enabled by the range gate generator flip-flop (44, FIG. 2 of my above referenced patent); the zero output of the range gate flip-flop being suitable for the purpose. The outputs of the AND gates 172 and 176 are gated through an OR gate 178. The OR gate provides either of two output frequencies which may occur during two successive intervals; namely, (a) an 8 megacycle (approximately) pulse train during the interval between the reply and filler pulses, and (b) a 1 megacycle (approximately) pulse train during the interval outside of the range gate when the reply and filler pulses are produced. The 8 megacycle pulse train occurs during a period of time much shorter than the period of time of occurrence of 1 megacycle pulse train which follows the 8 megacycle pulse train.

The 1 megacycle pulse train is applied to a first counter 180 and through the OR gate 178 to a second counter 182 which is similar to the first counter 180. The eight megacycle pulse train is also applied to the second counter 182 via the AND gate 172 and OR gate 178. Both counters may suitable be binary counters which count to 32.

The counters are reset by the early pulse which is applied to reset lines thereof through an OR gate 184. The counters may alternatively be reset by the delayed filler pulse which is applied to the OR gate 184 via an AND gate 186. This AND gate 186 is enabled only if a reply pulse was missing during the previous dwell. The early pulse resets the counters 180 and 182 at the beginning of the range gate in each dwell. The delayed filler pulse is operative to end the range gate during the tracking mode of operation as also explained above in connection with FIG. 2. Accordingly, when the reply pulse is missing during the previous dwell, the counters are reset after the range gate and the counts registered therein do not reflect the counts accumulated during the range gate period. Since the counts which are registered during the range gate reflect the magnitude of the time error between the time of occurrence between reply and filler pulses, the time error magnitude will not be manifested except during the reception of reply pulses, and merely an output indicating the sense of the error will be produced.

The output signals are produced by two AND gates 188 and 190 which respectively provide an output when the reply is early and when the reply is late. An inverter 192 is connected to the output of the latter AND gate 192 so that the early and late outputs will respectively be of opposite polarity. These outputs may then be applied to the integrator 132, FIG. 3, which produces an error voltage having a polarity and magnitude indicative of the sense and magnitude of the average time error. Inputs to the AND gates 188 and 190 are provided by the memory flip-flop 168 and the counter outputs.

In operation, the counters 180 and 182 are reset by the early pulse. The OR gate passes a burst of 8 megacycle clock pulses during the interval between the time of occurrence of the reply and filler pulses. The number of pulses in this burst, and therefore the count registered in the counter 182 during the range gate, corresponds to the time error between time of occurrence between reply and filler pulses. The counter 182 therefore has a count registered there at the end of the range gate interval which corresponds to the time error. At the end of the range gate interval, this count is incremented by the one megacycle clock pulses. The counter 180, on the other hand, receives only the one megacycle clock pulses during intervals outside of the range gate. The counters therefore provide a number of pulses to the AND gates 188 and 190 throughout the dwell, which is a function of the time error between the reply and filler pulse occurrences. Only one of these AND gates 188 and 190 is enabled. When the reply pulse was early, the AND gate 188 is enabled and produces a pulse train of one polarity, say positive, whereas when the reply is late, the AND gate 190 is enabled and produces a pulse train of opposite polarity, say negative. The number of pulses in these trains depends on the magnitude of the time error. Accordingly, when the average value of these pulse trains is obtained over a number of dwells, for example, 50 dwells being suitable, the output voltage of the integrator is a DC level, having a magnitude which depends upon the time error.

From the foregoing description, it will be apparent that there has been provided an improved computer system which is especially adapted for use in TACAN and like navigation systems. While the invention has been described in terms of digital logic components, such as AND gates and OR gates, it will be appreciated that other forms of digital logic will be used to implement the invention. Other modifications in the described range computer will, of course, be obvious to those skilled in the art. Accordingly, the foregoing description should be taken merely as illustrative and not in any limiting sense.

What is claimed is:

1. A time error detector for providing an output corresponding to the time interval between a first and a second pulse which occur in close time relationship with each other, said detector comprising a. means responsive to said first and said second pulses for respectively producing a third pulse if, and only if, said first pulse occurs before said second pulse and a fourth pulse if, and only if, said second pulse occurs before said first pulse, said third and fourth pulses having durations corresponding to the time interval between said first and second pulses, b. a memory element responsive to said third and fourth pulses which provide storage which represents the occurrence thereof, c. a counter, d. a source of clock pulses of frequency higher than the individual frequency of said first and second pulses, e. gate means responsive to said third and fourth pulses for transmitting said clock pulses to said counter for the duration thereof, f. means for transmitting said clock pulses to said counter for a time interval which occurs subsequent to the occurrence of said first and second pulses, and g. output gates enabled respectively by said memory element for transmitting output of said counter respectively when said first pulse precedes said second pulse and when said second pulse precedes said first pulse.

2. The invention as set forth in claim 1, wherein said first named means includes a pair of flip-flops respectively set and reset by said first pulse and reset and set by said second pulse, and a pair of gate means respectively input connected to oppositely valued outputs of different ones of said flip-flops.

3. The invention as set forth in claim 1 including means for resetting said counter prior to said first and second pulses.

4. The invention as set forth in claim 2 including means for resetting said counter with said second pulse when said first pulse is present.

5. The invention as set forth in claim 1 including a second counter and a divider, the input of said divider being connected to said clock pulse source, means for applying the output of said divider to both of said counters in a predetermined periods which extends over intervals after each of said second pulses and before each of said first pulses, said second counter also being connected to said output gates.

* * * * *